United States Patent

Schlanzky

[11] 3,982,225
[45] Sept. 21, 1976

[54] PNEUMATIC SWITCH FOR LOW TIRE PRESSURE WARNING SYSTEM

[75] Inventor: Manfred P. H. Schlanzky, Alpena, Mich.

[73] Assignee: General Motors Corporation, Detroit, Mich.

[22] Filed: Dec. 8, 1975

[21] Appl. No.: 638,968

[52] U.S. Cl. .......................... 340/58; 200/61.25; 200/83 C
[51] Int. Cl.² .................................. B60C 23/02
[58] Field of Search ........ 340/58; 200/61.22, 61.25, 200/83 R, 83 A, 83 C, 83 Q, 83 S, 83 SA

[56] References Cited
UNITED STATES PATENTS

| | | | |
|---|---|---|---|
| 3,537,068 | 10/1970 | Amundsen, Jr. | 340/58 |
| 3,593,268 | 7/1971 | Arvan | 340/58 |

Primary Examiner—Alvin H. Waring
Attorney, Agent, or Firm—Warren D. Hill

[57] ABSTRACT

A pneumatic switch located within a tire emits a pulse of air from the tire when the tire pressure drops a preset amount below the normal operating pressure. A bellows in the switch is charged to normal operating pressure and when tire pressure drops, the bellows extends to open a valve to emit the air pulse to actuate a warning system. A valve in the bellows is opened manually to establish the pressure charge within the bellows at the level of the tire pressure when the tire is inflated. The same valve in the bellows is automatically opened during tire deflation after the air pulse is emitted to equalize the bellows charge with the lower tire pressure in order to avoid a pressure differential across the bellows sufficient to damage the bellows.

3 Claims, 4 Drawing Figures

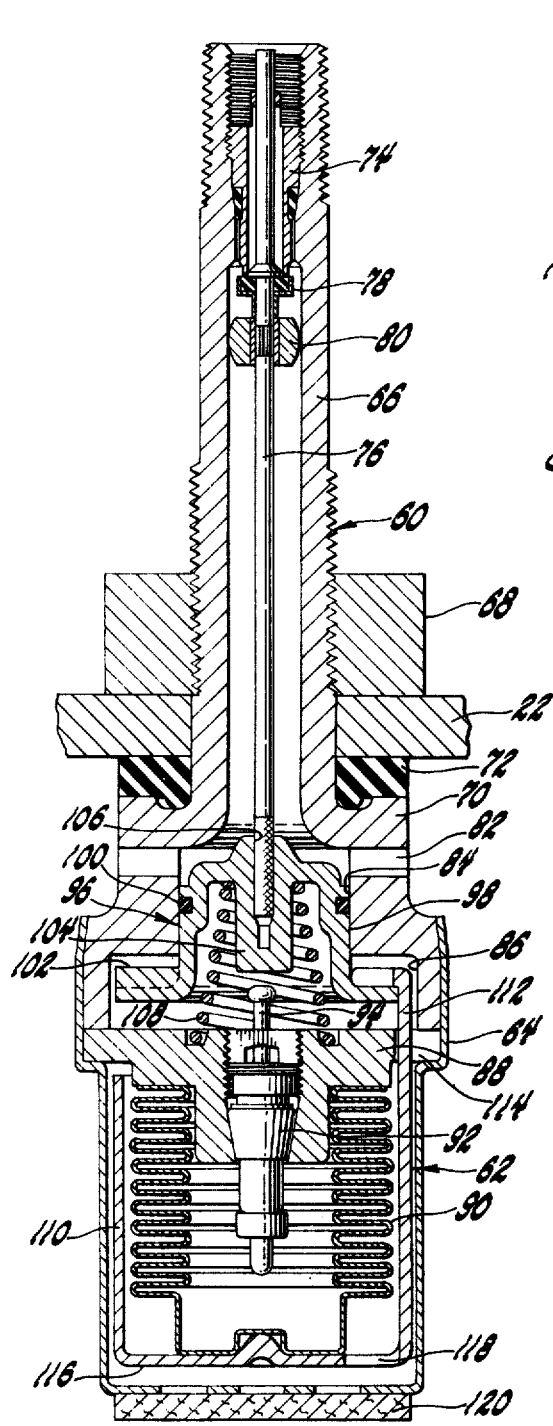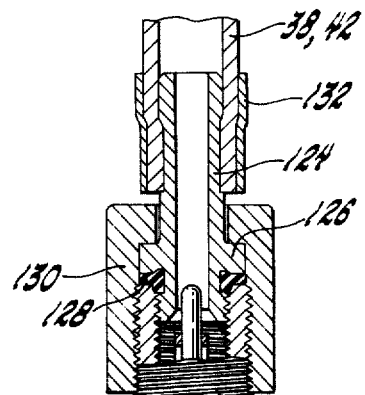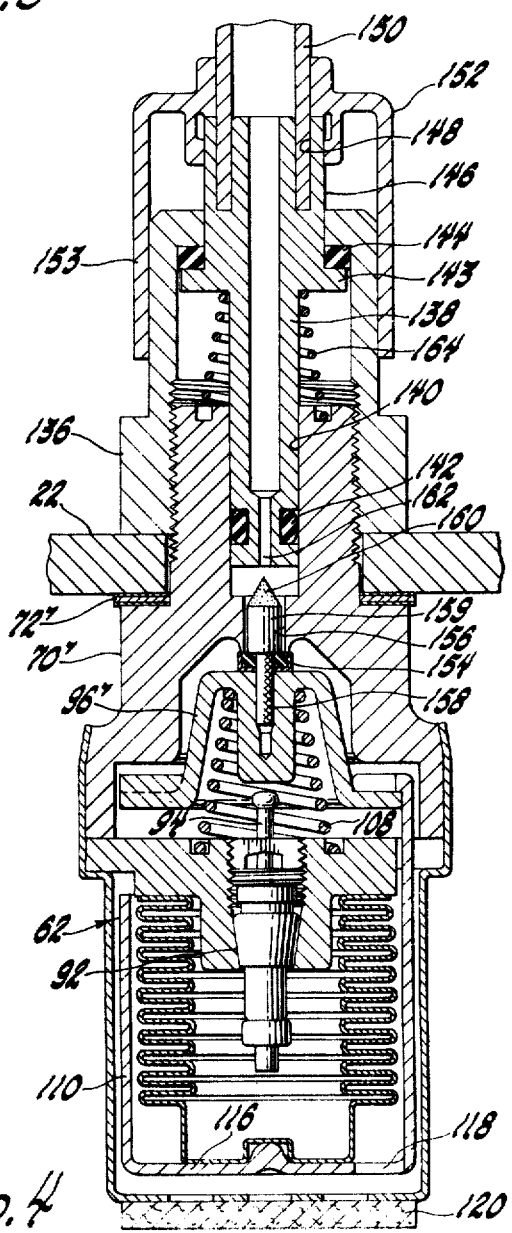
Fig. 2
Fig. 3
Fig. 4

PNEUMATIC SWITCH FOR LOW TIRE PRESSURE WARNING SYSTEM

This invention relates to a low pressure warning system for a vehicle mounted pneumatic tire and particularly to a low pressure sensing unit therefor.

It has been proposed to equip pneumatic tire vehicles with warning systems to alert the vehicle operator of an abnormal decrease of tire pressure. One type of tire deflation detector employs a bellows charged internally to normal inflation pressure and exposed externally to actual tire inflation pressure. If the bellows is precharged to a specified inflation pressure, then a given pneumatic switch would be limited in its usefulness to tires operating at that pressure. Therefore, it is desirable to be able to adjust the bellows charge pressure to values suitable for a wide range of applications. In addition a bellows charged to a certain pressure is exposed to a large pressure differential, for example, when a flat tire occurs, so that the bellows must have a rugged structure and high spring rate to withstand the forces imposed thereon. The high spring rate bellows on the other hand causes substantial hysteresis of the switching point of the pneumatic switch. Thus it is desirable to use a low spring rate and more sensitive bellows which results in less hysteresis.

It is therefore an object of the invention to provide a low pressure sensing unit having a control for adjustably setting the switch point pressure and for limiting differential pressure imposed on the components of the unit.

It is a further object of the invention to provide in such a low pressure sensing unit a single valve for setting a reference pressure in the unit and for relieving pressure from the unit when a large pressure differential exists.

The invention is carried out by providing a low pressure sensing unit for a pneumatic tire having an expansible chamber, a valve to open the chamber to tire inflation pressure to permit adjustment of the chamber pressure to the normal tire inflation pressure, and a mechanism responsive to chamber expansion to produce a signal when the tire pressure drops a certain amount and to open the valve to relieve chamber pressure when the tire pressure drops by a larger amount.

The above and other advantages will be made more apparent from the following specification taken in conjunction with the accompanying drawings wherein like reference numerals refer to like parts and wherein;

FIG. 2 is a cross-sectional view of a low pressure sensing unit according to the invention;

FIG. 3 is a cross-sectional view of an adapter for connecting the pressure unit of FIG. 2 to the remainder of the warning system; and FIG. 4 is another embodiment of a low pressure sensing unit according to the invention.

Figure 1:
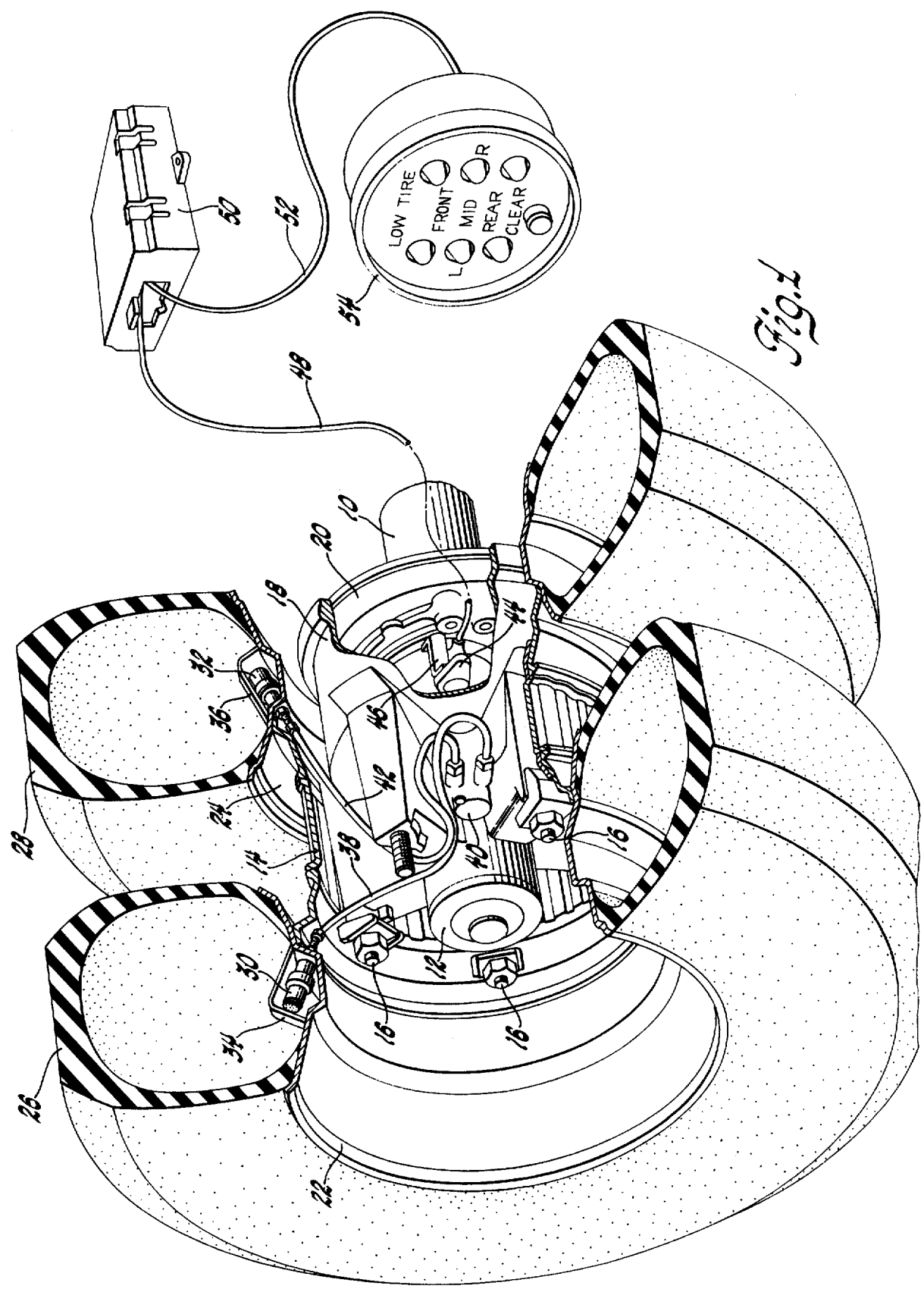
FIG. 1 is a perspective view of a dual wheel and tire assembly illustrating a low tire pressure warning system incorporating the sensing unit of this invention.

Referring to FIG. 1, there is illustrated a dual wheel assembly of conventional construction which may be used, for example, on a truck or bus. The invention is described with respect to such a dual wheel system for illustration purposes only, it being apparent that the tire pressure warning system of this invention may be readily adapted for use with single or multiple tired wheels.

An axle housing 10 is connected to the vehicle chassis for supporting the vehicle wheel assembly. A rotatable hub 12 is mounted on the axle housing 10 by means of suitable bearings and is driven by a rotatable axle, not shown, extending through the axle housing 10. A wheel 14 is connected to the hub 12 by bolt assemblies 16 which also secure a brake drum 18 to the hub 12. A plate member 20 is mounted on the axle housing 10 within the rim of the brake drum 18 and may support the brake shoes which cooperate with the brake drum 18 in the conventional manner. A rim 22 and a rim 24 are each mounted on the rims 22 and 24, respectively.

A low pressure air switch assembly 30 is mounted on the rim 22 extending into the tire 26 to monitor the air pressure therein. A low pressure air switch assembly 32 is mounted on the rim 24 extending into the tire 28 to monitor the tire pressure therein. Shields 34 and 36 are provided for protecting the air switch assemblies 30 and 32, respectively, during assembly of the tires 26 and 28 on the rims 22 and 24.

An air hose 38 couples the output of the low pressure air switch assembly 30 to one air inlet of an actuator 40 and an air hose 42 couples the output of the low pressure air switch assembly 32 to a second air inlet of the actuator 40. The actuator 40 is mounted on the face of the brake drum 18 so as to extend laterally therethrough A sensor 44 is mounted to the plate member 20 by means of a bracket assembly 46 such that the sensor 44 is positioned adjacent a path traced by the end of the actuator 40. An electric cable 48 couples the sensor 44 to a signal processor 50 whose output is coupled by a cable 52 to an instrument panel display 54.

Each of the low pressure air switches 30 and 32 are responsive to the air pressures within the respective tires 26 and 28 and function to couple the air within those tires to the actuator 40 via the respective air hoses 38 and 42 when the pressure sensed thereby decreases to a specified level below a reference pressure. The air under pressure from the respective tire 26 or 28 operates the actuator 40 which generates an external magnetic field. The sensor 44 is responsive to the magnetic field produced by the actuator 40 to generate an electric signal which is coupled to the signal processor 50 through the cable 48. The signal processor 50 supplies a signal via the cable 52 to energize an appropriate indicator in the instrument panel display 54 to provide an indication of the decreased tire pressure.

The air switch 30 or 32 is shown in cross section in FIG. 2 mounted to a rim 22. The air switch comprises a stem assembly 60 and a cage assembly 62 held together by a shell 64 which encloses and protects sensitive parts of the cage assembly. The stem assembly 60 comprises a long tire filler stem 66 extending through the rim 22 and secured thereto by a nut 68, and a broadened base 70 holding a seal 72 against the inner surface of the rim 22.

The outer end of the stem 66 is threaded both internally and externally. A tubular valve body 74 is threaded inside the stem into sealing engagement with the inner wall of the stem. A long pin 76 extends through the stem 66 and the valve body 74 and terminates near the opening of the stem 66. A cup shaped valve seat 78 filled with resilient material is mounted on the pin 76 and is normally positioned to close the lower opening of the valve body 74. Guide vanes 80 secured below the valve seat 78 loosely fit within the stem 66 to center the pin and to avoid excessive vibration. Radial ports 82 in the enlarged base 70 provide air communication between the stem interior and the tire. The base 70 includes a first cylindrical bore 84 and a second larger cylindrical bore 86 at its lower terminus.

The cage assembly 62 includes a bellows end plate 88 or support member which extends across and is secured to the bottom of the base 70 by the shell 64. An expansible chamber in the form of a bellows 90 is sealed to the under surface of the end plate 88. A central hole through the end plate 88 is threaded at its upper end and tapers inwardly at its lower end and a conventional tire valve 92 is threaded into the opening and seals in the conical portion of the opening. The tire valve includes an upwardly protruding pin 94.

A generally hat-shaped retainer 96 includes a cylindrical portion 98 slidably disposed in the bore 84 and includes an O-ring seal 100. A radially flared lower portion 102 of the retainer extends into the bore 86. Within the cylindrical portion 98 a centrally disposed abutment 104 extends downwardly to a position which is normally slightly spaced from the pin 94 of the valve 92. A small bore 106 on the top of the abutment 104 securely receives the lower end of the pin 76. A compression spring 108 between the end plate and the retainer 96 biases the retainer 96 and pin 76 upwardly in normal position to the extent allowed by the valve seat 78 on the pin 76.

A cylindrical cage 110 has resilient legs 112 which extend upwardly through apertures 114 in the end plate 88. The legs 112 terminate in inwardly extending hooks which snap over the lower portion 102 of the retainer. The body of the cage 110 surrounds the bellows 90 and a lower end cap 116 engages the lower end of the bellows which comprises a movable wall portion of the expansible chamber. An aperture 118 in the end cap 116 provides an air passage. The lower end of the shell 64 is apertured and is covered with an air filter 120 to allow passage of clean air from the tire into the cage assembly.

In operation the parts of the air switch are in the position shown in the drawing, that is the valve seat 78 is closed against the valve body 74 due to the action of the spring 108 and the abutment 104 is spaced from the pin 94 so that the valve 92 is closed. During inflation of the tire, a standard air chuck connected to a compressed air hose is pressed against the top of the stem 66 and the center post in the air chuck depresses the pin 76 against the action of the spring 108. Thus the valve seat 78 is moved to a valve open position and in addition, the retainer 96 is moved downwardly so that the abutment 104 depresses the pin 94 to open the valve 92.

Compressed air then flows through the valve stem and through the radial ports 82 to inflate the tire. The tire air flows through the filter 120 and around the legs 112 of the cage 110 and through the open valve 92 to the interior of the bellows so that the bellows is charged to a reference pressure equal to the inflation pressure of the tire. Of course, when the air chuck is removed, the valve seat 78 will close against the valve body 94 and the valve 92 will likewise close.

In the event of tire pressure decrease beyond a predetermined amount, the pressure differential between the bellows interior and exterior operating against the force of the spring 108 causes elongation of the bellows so that the cage 110 and the retainer 96 moves downwardly to separate the valve seat 78 from the valve body 74 allowing a burst of air from the tire to be emitted to actuate the remainder of the warning system. If the tire pressure decreases by a second predetermined amount larger than the pressure drop which caused the signal, the abutment 104 will engage the pin 94 to open the valve 92 thus allowing a rebalancing of pressure across the bellows and avoiding the build up of excessively high pressure differential acting on the bellows. The pressure rebalancing allows the bellows to contract closing both valves. Should tire pressure continue to decrease, the cycle will be repeated so that the reference pressure within the bellows will stepwise decrease following the inflation pressure decrease. The interruption of the air signal which is emitted when the valve 74, 78 closes is not significant since the warning system is actuated when the first pulse is emitted.

It will thus be seen that the single valve 92 allows charging of the bellows to a pressure consistent with the desired tire inflation pressure whenever the tire is inflated and also allows pressure balancing across the bellows when large tire pressure drops occur. This permits the use of sensitive low spring rate bellows which might otherwise be damaged by large pressure differentials.

FIG. 3 illustrates an adapter for coupling the hose 38 or 42 to the stem 66. A tube 124 has a radial flange 126 near one end and a resilient seal 128 adjacent the flange for sealing with the top of the stem 66. A nut 130 which fits over the tube 124 against the flange 126 cooperates with the external threads on the stem 66 to seal the tube 124 onto the stem 66. The upper end of the tube 124 fits within the air hose 38 or 42 and a sleeve 132 secures the hose to the tube 124. In usage, after the tire is inflated the adapter of FIG. 3 is threaded onto the stem 66 so that whenever a tire pressure decrease actuates the air switch to emit a pulse of air, that air pulse is coupled by the hose 38 or 42 to the actuator 40.

FIG. 4 depicts another embodiment of an air switch wherein the cage assembly 62 is essentially the same as that of FIG. 2. The main difference is that the retainer 96' does not have a close fit within the stem portion. A base portion 70' extends through an aperture in the rim 22 and a seal 72' is provided between the base portion and the rim. The base portion 70', which extends through the rim 22, is externally threaded to receive a nut 136. A sliding stem 138 fits within a bore 140 of a base 70' and a seal 142 is provided around the stem 138. A radially extending flange 143 on the stem 138 entraps a seal 144 against the top of the nut 136.

An enlarged upper portion 146 of the stem 138 passes through an aperture in the top of the nut 136 and is formed with an annular groove 148 in its upper end to securely hold a tube 150 which is crimped into the groove 148. The tube 150, in turn, is secured to an air hose 38 or 42, not shown in FIG. 4. A dust cover 152 is pressed over the tube 150 and includes a skirt portion 153 which slidably surrounds the nut 136.

A cup-shaped valve seat 154 secured to the top of the retainer 96' seats against a passage 156 in the base member 70'. The valve seat 154 is secured to the retainer 96' by a pin 158 which includes an enlarged portion 159 extending through the passage 156 and is provided at its upper end with a resilient conical seal 160. The seal 160 is slightly spaced from and aligned with a central passage 162 in the stem 138. A compression spring 164 surrounds the stem 138 and seats against the flange 143 and the top of the base 70' to bias the stem upwardly against the seal 144.

When this embodiment is used, a separate tire inflation stem, not shown, is required. When the tire is inflated, a manual operation is necessary to charge the bellows 90 to the tire inflation pressure. This is accomplished by pushing down on the dust cover 152 to depress the stem 138 against the bias of the spring 164 so that the passage 162 seats against the conical seal 160 and depresses the retainer 96' to open the valve 154, 156 as well as the valve 92. The sealing of the passage 162 prevents air escape through the valve 154, 156. Then the interior bellows pressure assumes the pressure of the tire and the dust cover 152 is released so that the assembly returns to its normal position as shown in the drawing.

During pressure decreases, the bellows extension causes downward movement of the retainer 96' in the manner discussed in FIG. 2 so that valve 154, 156 is opened allowing a burst of air to pass from the tire via the filter 120 through the stem 138 and tube 150 to the remainder of the warning system.

The feature of the cage assembly which permits relief of excessive bellows pressure differential when tire pressure drops is the same in the FIG. 4 embodiment as in FIG. 2.

It will thus be seen that the invention described herein provides a pressure sensor for a low tire pressure warning system wherein the pressure switch point is adjustable to suit the requirements of the specific application and also provides a feature for limiting the air pressure across the bellows upon time pressure drop so that a sensitive, low spring rate and low hysteresis bellows may be used without danger of damage thereto.

The embodiments of the invention in which an exclusive property or privilege is claimed are defined as follows:

1. In a low pressure warning system for a vehicle mounted pneumatic tire assembly normally inflated to a normal operating pressure, a low pressure sensing unit for providing a signal when the tire inflation pressure drops to a certain amount below the normal operating pressure comprising a support member secured to the said tire assembly,
an expansible chamber fixed to the support and including a wall portion movable in response to the differential of air pressures acting on the movable portion, the exterior of the chamber being exposed to the tire inflation pressure and the interior of the chamber being charged to a reference pressure,
the chamber including a normally closed valve effective when opened to provide air communication between the interior and exterior of the chamber thereby tending to equalize the interior and exterior air pressures,
valve actuating means,
means operating the valve actuating means to open the valve for charging the reference pressure in the chamber to the normal operating pressure when the tire is normally inflated, and
means actuated by the movable wall portion connected to signal actuating means for producing a signal when the tire inflation pressure drops a first amount below the chamber reference pressure and further connected to the valve actuating means for opening the valve when the tire inflation pressure drops a second amount larger than the said first amount below the chamber reference pressure to relieve pressure from the chamber interior whereby the pressure differential acting on the movable wall portion is limited to a value insufficient to damage the expansible chamber.

2. In a low pressure warning system for a vehicle mounted pneumatic tire assembly normally inflated to a normal operating pressure, a low pressure sensing unit for providing a signal when the tire inflation pressure drops to a certain amount below the normal operating pressure comprising a support member secured to the said tire assembly,
an expansible chamber fixed to the support and including a wall portion movable in response to the differential of air pressures acting on the movable portion, the exterior of the chamber being exposed to the tire inflation pressure and the interior of the chamber being charged to a reference pressure,
the chamber including a normally closed first valve effective when opened to provide air communication between the interior and exterior of the chamber thereby tending to equalize the interior and exterior air pressures,
a second normally closed valve mounted on the support member and exposed to the tire inflation pressure effective when opened to emit a pneumatic signal by exhausting a portion of the tire air,
valve actuating means for operating the first and second valves,
manually controlled means operating the valve actuating means to open the first valve for charging the reference pressure in the chamber to the normal operating pressure when the tire is normally inflated,
means connected to the movable wall portion and responsive to a predetermined displacement of the wall portion for operating the valve actuating means to one position for opening the second valve to produce a signal when the tire inflation pressure drops a first amount below the chamber reference pressure, and responsive to a second predetermined displacement of the wall portion for operating the valve actuating means to another position for opening the first valve when the tire inflation pressure drops by an amount larger than the first amount below the chamber reference pressure to relieve pressure from the chamber interior whereby the pressure differential acting on the movable wall portion is limited to a value insufficient to damage the expansible chamber.

3. In a low pressure warning system for a vehicle mounted pneumatic tire assembly normally inflated to a normal operating pressure, a low pressure sensing unit for providing a signal when the tire inflation pressure drops to a certain amount below the normal operating pressure comprising a support member secured to the said tire assembly,
a bellows having one end fixed to the support and having a free end movable in response to the differential of air pressures acting on the bellows, the bellows exterior being exposed to the tire inflation pressure and the interior of the bellows being charged to a reference pressure, the bellows having a low spring rate to provide sensitive response to pressure changes and being subject to damage in the event of large pressure differentials acting on the bellows, means for adjustably setting the reference pressure in the bellows and for preventing a large pressure differential on the bellows including, a normally closed valve in the support effective when opened to provide air communication between the bellows interior and exterior thereby tending to equalize interior and exterior air pressures, valve actuating means, manually controlled means operating the valve actuating means to open the valve for charging the reference pressure in the bellows to the normal operating pressure when the tire is normally inflated, means actuated by bellows extension due to tire pressure drop and connected to the valve actuating means for opening the valve when the tire pressure drops a certain amount below the reference pressure insufficient to cause bellows damage to relieve pressure from the bellows interior thereby limiting the pressure differential on the bellows to a safe value; and the valve actuating means further being connected to signal actuating means and responsive to a bellows extention at a pressure differential less than that required to open the valve for producing a signal indicative of low tire pressure.

* * * * *